(12) United States Patent
Liddiard et al.

(10) Patent No.: US 9,305,735 B2
(45) Date of Patent: Apr. 5, 2016

(54) REINFORCED POLYMER X-RAY WINDOW

(75) Inventors: Steven D. Liddiard, Springville, UT (US); Charles R. Jensen, American Fork, UT (US); Michael Zappe, Orem, UT (US); Keith W. Decker, Pleasant Grove, UT (US); Robert C. Davis, Provo, UT (US); Lei Pei, Provo, UT (US); Richard R. Vanfleet, Provo, UT (US)

(73) Assignees: Brigham Young University, Provo, UT (US); Moxtek, Inc., Orem, UT (US)

(*) Notice: Subject to any disclaimer, the term of this patent is extended or adjusted under 35 U.S.C. 154(b) by 847 days.

(21) Appl. No.: 13/018,667

(22) Filed: Feb. 1, 2011

(65) Prior Publication Data

US 2012/0025110 A1    Feb. 2, 2012

Related U.S. Application Data

(63) Continuation-in-part of application No. 12/239,281, filed on Sep. 26, 2008, and a continuation-in-part of application No. 12/899,750, filed on Oct. 7, 2010.

(60) Provisional application No. 60/995,881, filed on Sep. 28, 2007, provisional application No. 61/437,792, filed on Jan. 31, 2011.

(51) Int. Cl.
*B32B 9/00* (2006.01)
*H01J 5/18* (2006.01)
(Continued)

(52) U.S. Cl.
CPC ................. *H01J 5/18* (2013.01); *C01B 31/022* (2013.01); *H01J 35/18* (2013.01); *H01J 2235/183* (2013.01); *Y10T 428/24132* (2015.01); *Y10T 428/24331* (2015.01); *Y10T 428/30* (2015.01); *Y10T 428/31721* (2015.04)

(58) Field of Classification Search
CPC .......... C01B 31/022–31/0293; C01B 31/0438; Y10T 428/30; Y10S 977/742
USPC .................... 428/408; 423/447.1, 447.2, 448; 977/742
See application file for complete search history.

(56) References Cited

U.S. PATENT DOCUMENTS

| | | | |
|---|---|---|---|
| 1,276,706 | A | 5/1918 | Snook et al. |
| 1,881,448 | A | 10/1932 | Forde et al. |
| 1,946,288 | A | 2/1934 | Kearsley |

(Continued)

FOREIGN PATENT DOCUMENTS

| | | |
|---|---|---|
| DE | 1030936 | 5/1958 |
| DE | 4430623 | 3/1996 |

(Continued)

OTHER PUBLICATIONS

U.S. Appl. No. 12/239,281, filed Sep. 26, 2008; Robert C. Davis; office action issued Dec. 13, 2011.

(Continued)

*Primary Examiner* — Daniel H Miller
(74) *Attorney, Agent, or Firm* — Thorpe, North & Western, LLP

(57) ABSTRACT

An x-ray window comprising a polymer and carbon nanotubes and/or graphene. The carbon nanotubes and/or graphene can be embedded in the polymer. Multiple layers of polymer, carbon nanotubes, and/or graphene may be used. The polymer with carbon nanotubes and/or graphene can be used as an x-ray window support structure and/or thin film.

18 Claims, 5 Drawing Sheets

(51) Int. Cl.
  *C01B 31/02* (2006.01)
  *H01J 35/18* (2006.01)

(56) References Cited

U.S. PATENT DOCUMENTS

| | | | |
|---|---|---|---|
| 2,291,948 A | 8/1942 | Cassen | |
| 2,316,214 A | 4/1943 | Atlee et al. | |
| 2,329,318 A | 9/1943 | Atlee et al. | |
| 2,340,363 A | 2/1944 | Atlee et al. | |
| 2,502,070 A | 3/1950 | Atlee et al. | |
| 2,663,812 A | 3/1950 | Jamison et al. | |
| 2,683,223 A | 7/1954 | Hosemann | |
| 2,952,790 A | 9/1960 | Steen | |
| 3,397,337 A | 8/1968 | Denholm | |
| 3,358,368 A | 11/1970 | Oess | |
| 3,665,236 A | 5/1972 | Gaines et al. | |
| 3,679,927 A | 7/1972 | Kirkendall | |
| 3,691,417 A | 9/1972 | Gralenski | |
| 3,751,701 A | 8/1973 | Gralenski et al. | |
| 3,801,847 A | 4/1974 | Dietz | |
| 3,828,190 A | 8/1974 | Dahlin et al. | |
| 3,873,824 A | 3/1975 | Bean | |
| 3,882,339 A | 5/1975 | Rate et al. | |
| 3,962,583 A | 6/1976 | Holland et al. | |
| 3,970,884 A | 7/1976 | Golden | |
| 4,007,375 A | 2/1977 | Albert | |
| 4,075,526 A | 2/1978 | Grubis | |
| 4,126,788 A | 11/1978 | Koontz et al. | |
| 4,160,311 A | 7/1979 | Ronde et al. | |
| 4,163,900 A | 8/1979 | Warren et al. | |
| 4,178,509 A | 12/1979 | More et al. | |
| 4,184,097 A | 1/1980 | Auge | |
| 4,250,127 A | 2/1981 | Warren et al. | |
| 4,293,373 A | 10/1981 | Greenwood | |
| 4,368,538 A | 1/1983 | McCorkle | |
| 4,393,127 A | 7/1983 | Greschner et al. | |
| 4,443,293 A | 4/1984 | Mallon et al. | |
| 4,463,338 A | 7/1984 | Utner et al. | |
| 4,521,902 A | 6/1985 | Peugeot | |
| 4,532,150 A | 7/1985 | Endo et al. | |
| 4,573,186 A | 2/1986 | Reinhold | |
| 4,576,679 A | 3/1986 | White | |
| 4,584,056 A | 4/1986 | Perret et al. | |
| 4,591,756 A | 5/1986 | Avnery | |
| 4,608,326 A | 8/1986 | Neukermans et al. | |
| 4,645,977 A | 2/1987 | Kurokawa et al. | |
| 4,675,525 A | 6/1987 | Amingual et al. | |
| 4,679,219 A | 7/1987 | Ozaki | |
| 4,688,241 A | 8/1987 | Peugeot | |
| 4,696,994 A | 9/1987 | Nakajima et al. | |
| 4,705,540 A | 11/1987 | Hayes | |
| 4,777,642 A | 10/1988 | Ono | |
| 4,797,907 A | 1/1989 | Anderton | |
| 4,818,806 A | 4/1989 | Kunimune et al. | |
| 4,819,260 A | 4/1989 | Haberrecker | |
| 4,837,068 A | 6/1989 | Martin et al. | |
| 4,862,490 A | 8/1989 | Karnezos et al. | |
| 4,870,671 A | 9/1989 | Hershyn | |
| 4,876,330 A | 10/1989 | Higashi et al. | |
| 4,878,866 A | 11/1989 | Mori et al. | |
| 4,885,055 A | 12/1989 | Woodbury et al. | |
| 4,891,831 A | 1/1990 | Tanaka et al. | |
| 4,933,557 A * | 6/1990 | Perkins | 250/505 |
| 4,939,763 A | 7/1990 | Pinneo et al. | |
| 4,957,773 A | 9/1990 | Spencer et al. | |
| 4,960,486 A | 10/1990 | Perkins et al. | |
| 4,969,173 A | 11/1990 | Valkonet | |
| 4,979,198 A | 12/1990 | Malcolm et al. | |
| 4,979,199 A | 12/1990 | Cueman et al. | |
| 5,010,562 A | 4/1991 | Hernandez et al. | |
| 5,055,421 A | 10/1991 | Birkle et al. | |
| 5,063,324 A | 11/1991 | Grunwald et al. | |
| 5,066,300 A | 11/1991 | Isaacson et al. | |
| 5,077,771 A | 12/1991 | Skillicorn et al. | |
| 5,077,777 A | 12/1991 | Daly | |
| 5,090,046 A * | 2/1992 | Friel | 378/161 |
| 5,105,456 A | 4/1992 | Rand et al. | |
| 5,117,829 A | 6/1992 | Miller et al. | |
| 5,153,900 A | 10/1992 | Nomikos et al. | |
| 5,161,179 A | 11/1992 | Suzuki et al. | |
| 5,173,612 A | 12/1992 | Imai et al. | |
| 5,196,283 A | 3/1993 | Ikeda et al. | |
| 5,206,534 A | 4/1993 | Birkle et al. | |
| 5,217,817 A | 6/1993 | Verspui et al. | |
| 5,226,067 A | 7/1993 | Allred et al. | |
| RE34,421 E | 10/1993 | Parker et al. | |
| 5,258,091 A | 11/1993 | Imai et al. | |
| 5,267,294 A | 11/1993 | Kuroda et al. | |
| 5,302,523 A | 4/1994 | Coffee et al. | |
| 5,343,112 A | 8/1994 | Wegmann | |
| 5,391,958 A | 2/1995 | Kelly | |
| 5,392,042 A | 2/1995 | Pellon | |
| 5,400,385 A | 3/1995 | Blake et al. | |
| 5,422,926 A | 6/1995 | Smith et al. | |
| 5,428,658 A | 6/1995 | Oettinger et al. | |
| 5,432,003 A | 7/1995 | Plano et al. | |
| 5,465,023 A | 11/1995 | Garner | |
| 5,469,429 A | 11/1995 | Yamazaki et al. | |
| 5,469,490 A | 11/1995 | Golden et al. | |
| 5,478,266 A | 12/1995 | Kelly | |
| 5,521,851 A | 5/1996 | Wei et al. | |
| 5,524,133 A | 6/1996 | Neale et al. | |
| 5,561,342 A | 10/1996 | Roeder et al. | |
| RE35,383 E | 11/1996 | Miller et al. | |
| 5,571,616 A | 11/1996 | Phillips et al. | |
| 5,578,360 A | 11/1996 | Viitanen | |
| 5,602,507 A | 2/1997 | Suzuki | |
| 5,607,723 A | 3/1997 | Plano et al. | |
| 5,616,179 A | 4/1997 | Baldwin et al. | |
| 5,621,780 A | 4/1997 | Smith et al. | |
| 5,627,871 A | 5/1997 | Wang | |
| 5,631,943 A | 5/1997 | Miles | |
| 5,673,044 A | 9/1997 | Pellon | |
| 5,680,433 A | 10/1997 | Jensen | |
| 5,682,412 A | 10/1997 | Skillicorn et al. | |
| 5,696,808 A | 12/1997 | Lenz | |
| 5,706,354 A | 1/1998 | Stroehlein | |
| 5,729,583 A | 3/1998 | Tang et al. | |
| 5,774,522 A | 6/1998 | Warburton | |
| 5,812,632 A | 9/1998 | Schardt et al. | |
| 5,835,561 A | 11/1998 | Moorman et al. | |
| 5,870,051 A | 2/1999 | Warburton | |
| 5,898,754 A | 4/1999 | Gorzen | |
| 5,907,595 A | 5/1999 | Sommerer | |
| 6,002,202 A | 12/1999 | Meyer et al. | |
| 6,005,918 A | 12/1999 | Harris et al. | |
| 6,044,130 A | 3/2000 | Inazura et al. | |
| 6,062,931 A | 5/2000 | Chuang et al. | |
| 6,063,629 A | 5/2000 | Knoblauch | |
| 6,069,278 A | 5/2000 | Chuang | |
| 6,073,484 A | 6/2000 | Miller et al. | |
| 6,075,839 A | 6/2000 | Treseder | |
| 6,097,790 A | 8/2000 | Hasegawa et al. | |
| 6,129,901 A | 10/2000 | Moskovits et al. | |
| 6,133,401 A | 10/2000 | Jensen | |
| 6,134,300 A | 10/2000 | Trebes et al. | |
| 6,184,333 B1 | 2/2001 | Gray | |
| 6,205,200 B1 | 3/2001 | Boyer et al. | |
| 6,277,318 B1 | 8/2001 | Bower | |
| 6,282,263 B1 | 8/2001 | Arndt et al. | |
| 6,288,209 B1 | 9/2001 | Jensen | |
| 6,307,008 B1 | 10/2001 | Lee et al. | |
| 6,320,019 B1 | 11/2001 | Lee et al. | |
| 6,351,520 B1 | 2/2002 | Inazaru | |
| 6,385,294 B2 | 5/2002 | Suzuki et al. | |
| 6,388,359 B1 | 5/2002 | Duelli et al. | |
| 6,438,207 B1 | 8/2002 | Chidester et al. | |
| 6,447,880 B1 | 9/2002 | Coppens | |
| 6,477,235 B2 | 11/2002 | Chornenky et al. | |
| 6,487,272 B1 | 11/2002 | Kutsuzawa | |
| 6,487,273 B1 | 11/2002 | Takenaka et al. | |
| 6,494,618 B1 | 12/2002 | Moulton | |
| 6,546,077 B2 | 4/2003 | Chornenky et al. | |
| 6,567,500 B2 | 5/2003 | Rother | |

(56) References Cited

U.S. PATENT DOCUMENTS

| | | |
|---|---|---|
| 6,644,853 B1 | 11/2003 | Kantor et al. |
| 6,645,757 B1 | 11/2003 | Okandan et al. |
| 6,646,366 B2 | 11/2003 | Hell et al. |
| 6,658,085 B2 | 12/2003 | Sklebitz |
| 6,661,876 B2 | 12/2003 | Turner et al. |
| 6,738,484 B2 | 5/2004 | Nakabayashi |
| 6,740,874 B2 | 5/2004 | Doring |
| 6,778,633 B1 | 8/2004 | Loxley et al. |
| 6,799,075 B1 | 9/2004 | Chornenky et al. |
| 6,803,570 B1 | 10/2004 | Bryson, III et al. |
| 6,803,571 B1 | 10/2004 | Mankos et al. |
| 6,816,573 B2 | 11/2004 | Hirano et al. |
| 6,819,741 B2 | 11/2004 | Chidester |
| 6,838,297 B2 | 1/2005 | Iwasaki |
| 6,852,365 B2 | 2/2005 | Smart et al. |
| 6,866,801 B1 | 3/2005 | Mau et al. |
| 6,876,724 B2 | 4/2005 | Zhou |
| 6,900,580 B2 | 5/2005 | Dai et al. |
| 6,944,268 B2 | 9/2005 | Shimono |
| 6,956,706 B2 | 10/2005 | Brandon |
| 6,962,782 B1 | 11/2005 | Livache et al. |
| 6,976,953 B1 | 12/2005 | Pelc |
| 6,987,835 B2 | 1/2006 | Lovoi |
| 7,035,379 B2 | 4/2006 | Turner et al. |
| 7,046,767 B2 | 5/2006 | Okada et al. |
| 7,049,735 B2 | 5/2006 | Ohkubo et al. |
| 7,072,439 B2 | 7/2006 | Radley et al. |
| 7,075,699 B2 | 7/2006 | Oldham et al. |
| 7,085,354 B2 | 8/2006 | Kanagami |
| 7,108,841 B2 | 9/2006 | Smally |
| 7,130,380 B2 | 10/2006 | Lovoi et al. |
| 7,130,381 B2 | 10/2006 | Lovoi et al. |
| 7,166,910 B2 | 1/2007 | Minervini |
| 7,189,430 B2 | 3/2007 | Ajayan et al. |
| 7,203,283 B1 | 4/2007 | Puusaari |
| 7,206,381 B2 | 4/2007 | Shimono et al. |
| 7,215,741 B2 | 5/2007 | Ukita |
| 7,224,769 B2 | 5/2007 | Turner |
| 7,233,071 B2 | 6/2007 | Furukawa et al. |
| 7,233,647 B2 | 6/2007 | Turner et al. |
| 7,236,568 B2 | 6/2007 | Dinsmore et al. |
| 7,286,642 B2 | 10/2007 | Ishikawa et al. |
| 7,305,066 B2 | 12/2007 | Ukita |
| 7,358,593 B2 | 4/2008 | Smith et al. |
| 7,364,794 B2 | 4/2008 | Ohnishi et al. |
| 7,378,157 B2 | 5/2008 | Sakakura et al. |
| 7,382,862 B2 | 6/2008 | Bard et al. |
| 7,399,794 B2 | 7/2008 | Harmon et al. |
| 7,410,603 B2 | 8/2008 | Noguchi et al. |
| 7,428,054 B2 | 9/2008 | Yu et al. |
| 7,428,298 B2 | 9/2008 | Bard et al. |
| 7,448,801 B2 | 11/2008 | Oettinger et al. |
| 7,448,802 B2 | 11/2008 | Oettinger et al. |
| 7,486,774 B2 | 2/2009 | Cain |
| 7,526,068 B2 | 4/2009 | Dinsmore |
| 7,529,345 B2 | 5/2009 | Bard et al. |
| 7,618,906 B2 | 11/2009 | Meilahti |
| 7,634,052 B2 | 12/2009 | Grodzins |
| 7,649,980 B2 | 1/2010 | Aoki et al. |
| 7,650,050 B2 | 1/2010 | Haffner et al. |
| 7,657,002 B2 | 2/2010 | Burke et al. |
| 7,680,652 B2 | 3/2010 | Giesbrecht et al. |
| 7,684,545 B2 | 3/2010 | Damento et al. |
| 7,693,265 B2 | 4/2010 | Hauttmann et al. |
| 7,709,820 B2 | 5/2010 | Decker et al. |
| 3,741,797 A1 | 6/2010 | Chavasse, Jr. et al. |
| 7,737,424 B2 | 6/2010 | Xu et al. |
| 7,756,251 B2 | 7/2010 | Davis et al. |
| 8,498,381 B2 | 7/2013 | Liddiard et al. |
| 8,761,344 B2 | 6/2014 | Reynolds et al. |
| 8,774,365 B2 | 7/2014 | Wang |
| 8,804,910 B1 | 8/2014 | Wang et al. |
| 8,929,515 B2 | 1/2015 | Liddiard |
| 8,989,354 B2 | 3/2015 | Davis et al. |
| 2002/0075999 A1 | 6/2002 | Rother |
| 2002/0094064 A1 | 7/2002 | Zhou |
| 2003/0096104 A1 | 5/2003 | Tobita et al. |
| 2003/0117770 A1 | 6/2003 | Montgomery et al. |
| 2003/0122111 A1* | 7/2003 | Glatkowski ............... 252/500 |
| 2003/0152700 A1 | 8/2003 | Asmussen et al. |
| 2003/0165418 A1 | 9/2003 | Ajayan et al. |
| 2004/0076260 A1 | 4/2004 | Charles, Jr. et al. |
| 2005/0018817 A1 | 1/2005 | Oettinger et al. |
| 2005/0141669 A1 | 6/2005 | Shimono et al. |
| 2005/0157305 A1 | 7/2005 | Yu et al. |
| 2005/0207537 A1 | 9/2005 | Ukita |
| 2006/0073682 A1 | 4/2006 | Furukawa et al. |
| 2006/0098778 A1 | 5/2006 | Oettinger et al. |
| 2006/0233307 A1 | 10/2006 | Dinsmore |
| 2006/0269048 A1 | 11/2006 | Cain |
| 2007/0025516 A1 | 2/2007 | Bard et al. |
| 2007/0087436 A1 | 4/2007 | Miyawaki et al. |
| 2007/0111617 A1 | 5/2007 | Meilahti |
| 2007/0133921 A1 | 6/2007 | Haffner et al. |
| 2007/0142781 A1 | 6/2007 | Sayre |
| 2007/0165780 A1 | 7/2007 | Durst et al. |
| 2007/0176319 A1 | 8/2007 | Thostenson et al. |
| 2007/0183576 A1 | 8/2007 | Burke et al. |
| 2008/0181365 A1 | 7/2008 | Matoba |
| 2008/0199399 A1 | 8/2008 | Chen et al. |
| 2008/0296479 A1 | 12/2008 | Anderson et al. |
| 2008/0296518 A1 | 12/2008 | Xu et al. |
| 2008/0317982 A1 | 12/2008 | Hecht |
| 2009/0085426 A1 | 4/2009 | Davis et al. |
| 2009/0086923 A1 | 4/2009 | Davis et al. |
| 2010/0003186 A1 | 1/2010 | Yoshikawa et al. |
| 2010/0096595 A1 | 4/2010 | Prud'Homme et al. |
| 2010/0126660 A1* | 5/2010 | O'Hara ................ 156/249 |
| 2010/0140497 A1 | 6/2010 | Damiano, Jr. et al. |
| 2010/0239828 A1 | 9/2010 | Cornaby et al. |
| 2010/0243895 A1 | 9/2010 | Xu et al. |
| 2010/0248343 A1 | 9/2010 | Aten et al. |
| 2010/0285271 A1 | 11/2010 | Davis et al. |
| 2010/0323419 A1 | 12/2010 | Aten et al. |
| 2011/0017921 A1 | 1/2011 | Jiang et al. |
| 2011/0031566 A1 | 2/2011 | Kim et al. |
| 2011/0089330 A1 | 4/2011 | Thomas |
| 2011/0121179 A1 | 5/2011 | Liddiard et al. |
| 2012/0003448 A1 | 1/2012 | Weigel et al. |
| 2012/0025110 A1 | 2/2012 | Davis et al. |
| 2013/0077761 A1 | 3/2013 | Sipila |
| 2013/0089184 A1 | 4/2013 | Sipila |
| 2013/0315380 A1 | 11/2013 | Davis et al. |
| 2014/0127446 A1 | 5/2014 | Davis et al. |
| 2014/0140487 A1 | 5/2014 | Harker et al. |
| 2015/0016593 A1 | 1/2015 | Larson et al. |

FOREIGN PATENT DOCUMENTS

| | | |
|---|---|---|
| DE | 19818057 | 11/1999 |
| EP | 0297808 | 1/1989 |
| EP | 0330456 | 8/1989 |
| EP | 0400655 | 5/1990 |
| EP | 0676772 | 3/1995 |
| GB | 1252290 | 11/1971 |
| JP | 57082954 | 8/1982 |
| JP | S6074253 | 4/1985 |
| JP | S6089054 | 5/1985 |
| JP | 3170673 | 7/1991 |
| JP | 05066300 | 3/1993 |
| JP | 5135722 | 6/1993 |
| JP | 06119893 | 7/1994 |
| JP | 6289145 | 10/1994 |
| JP | 6343478 | 12/1994 |
| JP | 8315783 | 11/1996 |
| JP | 2001179844 | 7/2001 |
| JP | 2003/007237 | 1/2003 |
| JP | 2003/088383 | 3/2003 |
| JP | 2003510236 | 3/2003 |
| JP | 2003/3211396 | 7/2003 |
| JP | 4171700 | 6/2006 |
| JP | 2006297549 | 11/2006 |
| KR | 10-2005-0107094 | 11/2005 |
| WO | WO96/19738 | 6/1996 |

(56) References Cited

FOREIGN PATENT DOCUMENTS

| WO | WO96-19738 | 6/1996 |
|---|---|---|
| WO | WO99/65821 | 12/1999 |
| WO | WO00/09443 | 2/2000 |
| WO | WO00/17102 | 3/2000 |
| WO | WO03/076951 | 9/2003 |
| WO | WO 2008/052002 | 5/2008 |
| WO | WO 2009/009610 | 1/2009 |
| WO | WO 2009/045915 | 4/2009 |
| WO | WO 2009/085351 | 7/2009 |
| WO | WO 2010/107600 | 9/2010 |

OTHER PUBLICATIONS

U.S. Appl. No. 12/814,912, filed Jun. 14, 2010; Degao Xu; office action issued Dec. 5, 2011.
Vajtai et al.; Building Carbon Nanotubes and Their Smart Architectures; Smart Mater. Struct. 2002; pp. 691-698; vol. 11.
PCT Application PCT/US2011/046371; filed Aug. 3, 2011; Steven Liddiard; International Search Report mailed Feb. 29, 2012.
Anderson et al., U.S. Appl. No. 11/756,962, filed Jun. 1, 2007.
Barkan et al., "Improved window for low-energy x-ray transmission a Hybrid design for energy-dispersive microanalysis," Sep. 1995, 2 pages, Ectroscopy 10(7).
Blanquart et al.; "XPAD, a New Read-out Pixel Chip for X-ray Counting"; IEEE Xplore; Mar. 25, 2009.
Chen, Xiaohua et al., "Carbon-nanotube metal-matrix composites prepared by electroless plating," Composites Science and Technology, 2000, pp. 301-306, vol. 60.
Comfort, J. H., "Plasma-enhanced chemical vapor deposition of in situ doped epitaxial silicon at low temperatures," J. Appl. Phys. 65, 1067 (1989).
Das, D. K., and K. Kumar, "Chemical vapor deposition of boron on a beryllium surface," Thin Solid Films, 83(1), 53-60.
Das, K., and Kumar, K., "Tribological behavior of improved chemically vapor-deposited boron on beryllium," Thin Solid Films, 108(2), 181-188.
Flahaut, E. et al., "Carbon Nanotube-metal-oxide nanocomposites; microstructure, electrical conductivity and mechanical properties," Acta mater., 2000, pp. 3803-3812.Vo. 48.
Gevin, et al. IDe-XV1.0: Performances of a New CMOS Multi channer Analogue Readout ASIC for Cd (Zn) Te Detectors; IEEE 2005.
Grybos et al.; "DEDIX—Development of Fully Integrated Multichannel ASIC for High Count Rate Digital X-ray Imagining systems"; IEEE 2006; Nuclear Science Symposium Conference Record.
Grybos, "Pole-Zero Cancellations Circuit With Pulse Pile-Up Tracking System for Low Noise Charge-Sensitive Amplifiers"; Mar. 25, 2009; from IEEE Xplore.
Grybos, et al. "Measurements of Matching and High Count Rate Performance of Multichannel ASIC for Digital X-Ray Imaging Systems"; IEEE Transactions on Nuclear Science, vol. 54, No. 4, 2007.
Hanigofsky, J. A., K. L. More, and W. J. Lackey, "Composition and microstructure of chemically vapor-deposited boron nitride, aluminum nitride and boron nitride + aluminum nitride composites," J. Amer. Ceramic Soc. 74, 301 (1991).
http://www.orau.org/ptp/collection/xraytubescollidge/MachelettCW250.htm, 1999, 2 pgs.
Hutchison, "Vertically aligned carbon nanotubes as a framework for microfabrication of high aspect ration mems," 2008, pp. 1-50.
Jiang, Linquin et al., "Carbon nanotubes-metal nitride composites; a new class of nanocomposites with enhanced electrical properties," J. Mater. Chem., 2005, pp. 260-266, vol. 15.
Komatsu, S., and Y. Moriyoshi, "Influence of atomic hydrogen on the growth reactions of amorphous boron films in a low-pressure $B_2H_6$ +He+$H_2$ plasma", J. Appl. Phys. 64, 1878 (1988).
Komatsu, S., and Y. Moriyoshi, "Transition from amorphous to crystal growth of boron films in plasma-enhanced chemical vapor deposition with $B_2H_6$ +He," J. Appl. Phys., 66, 466 (1989).
Komatsu, S., and Y. Moriyoshi, "Transition from thermal-to electron-impact decomposition of diborane in plasma-enhanced chemical vapor deposition of boron films from $B_2H_6$ +He," J. Appl. Phys. 66, 1180 (1989).
Lee, W., W. J. Lackey, and P. K. Agrawal, "Kinetic analysis of chemical vapor deposition of boron nitride," J. Amer. Ceramic Soc. 74, 2642 (1991).
Li, Jun et al., "Bottom-up approach for carbon nanotube interconnects," Applied Physics Letters, Apr. 14, 2003, pp. 2491-2493, vol. 82 No. 15.
Lines, U.S. Appl. No. 12/352,864, filed Jan. 13, 2009.
Lines, U.S. Appl. No. 12/726,120, filed Mar. 17, 2010.
MA. R.Z., et al., "Processing and properties of carbon nanotubes-nano-SIC ceramic", Journal of Materials Science 1998, pp. 5243-5246, vol. 33.
Maya, L., and L. A. Harris, "Pyrolytic deposition of carbon films containing nitrogen and/or boron," J. Amer. Ceramic Soc. 73, 1912 (1990).
Michaelidis, M., and R. Pollard, "Analysis of chemical vapor deposition of boron," J. Electrochem. Soc. 132, 1757 (1985).
Micro X-ray Tube Operation Manual, X-ray and Specialty Instruments Inc., 1996, 5 pages.
Moore, A. W., S. L. Strong, and G. L. Doll, "Properties and characterization of codeposited boron nitride and carbon materials," J. Appl. Phys. 65, 5109 (1989).
Nakamura, K., "Preparation and properties of amorphous boron nitride films by molecular flow chemical vapor deposition," J. Electrochem. Soc. 132, 1757 (1985).
Panayiotatos, et al., "Mechanical performance and growth characteristics of boron nitride films with respect to their optical, compositional properties and density," Surface and Coatings Technology, 151-152 (2002) 155-159.
PCT Application PCT/US08/65346; filed May 30, 2008; Keith Decker.
PCT Application PCT/US10/56011; filed Nov. 9, 2010; Krzysztof Kozaczek.
Peigney, et al., "Carbon nanotubes in novel ceramic matrix nanocomposites," Ceramics International, 2000, pp. 677-683, vol. 26.
Perkins, F. K., R. A. Rosenberg, and L. Sunwoo, "Synchrotronradiation deposition of boron and boron carbide films from boranes and carboranes: decaborane," J. Appl. Phys. 69,4103 (1991).
Powell et al., "Metalized polyimide filters for x-ray astronomy and other applications," SPIE, pp. 432-440, vol. 3113.
Rankov. A. "A Novel Correlated Double Sampling Poly-Si Circuit for Readout System in Large Area X-Ray Sensors", 2005.
Roca i Cabarrocas, P., S. Kumar, and B. Drevillon, "In situ study of the thermal decomposition of $B_2H_6$ by combining spectroscopic ellipsometry and Kelvin probe measurements," J. Appl. Phys. 66, 3286 (1989).
Satishkumar B.C., et al. "Synthesis of metal oxide nanorods using carbon nanotubes as templates," Journal of Materials Chemistry, 2000, pp. 2115-2119, vol. 10.
Scholze et al., "Detection efficiency of energy-dispersive detectors with low-energy windows" X-Ray Spectrometry, X-Ray Spectrom, 2005: 34: 473-476.
Sheather, "The support of thin windows for x-ray proportional counters," Journal Phys,E., Apr. 1973, pp. 319-322, vol. 6, No. 4.
Shirai, K., S.-I. Gonda, and S. Gonda, "Characterization of hydrogenated amorphous boron films prepared by electron cyclotron resonance plasma chemical vapor deposition method," J. Appl. Phys. 67, 6286 (1990).
Tamura, et al. "Developmenmt of ASICs for CdTe Pixel and Line Sensors", IEEE Transactions on Nuclear Science, vol. 52, No. 5, Oct. 2005.
Tien-Hui Lin et al., "An investigation on the films used as teh windows of ultra-soft X-ray counters." Acta Physica Sinica, vol. 27, No. 3, pp. 276-283, May 1978, abstract only.
U.S. Appl. No. 12/640,154, filed Dec. 17, 2009; Krzysztof Kozaczek.
U.S. Appl. No. 12/726,120, filed Mar. 17, 2010; Michael Lines.
U.S. Appl. No. 12/783,707, filed May 20, 2010; Steven D. Liddiard.
U.S. Appl. No. 12/899,750, filed Oct. 7, 2010; Steven Liddiard.
U.S. Appl. No. 13/018,667, filed Feb. 1, 2011; Lei Pei.

(56) References Cited

OTHER PUBLICATIONS

Vandenbulcke, L. G., "Theoretical and experimental studies on the chemical vapor deposition of boron carbide," Indust. Eng. Chem. Prod. Res. Dev. 24, 568 (1985).
Viitanen Veli-Pekka et al., Comparison of Ultrathin X-Ray Window Designs, presented at the Soft X-rays in the 21st Century Conference held in Provo, utah Feb. 10-13, 1993, pp. 182-190.
Wagner et al., "Effects of Scatter in Dual-Energy Imaging: An Alternative Analysis"; IEEE; Sep. 1989, vol. 8. No. 3.
Winter, J., H. G. Esser, and H. Reimer, "Diborane-free boronization," Fusion Technol. 20, 225 (1991).
www.moxtek.com, Moxtek, Sealed Proportional Counter X-Ray Windows, Oct. 2007, 3 pages.
www.moxtek.com, Moxtek, AP3 Windows, Ultra-thin Polymer X-Ray Windows, Sep. 2006, 2 pages.
www.moxtek.com, Moxtek, DuraBeryllium X-Ray Windows, May 2007, 2 pages.
www.moxtek.com, Moxtek, ProLine Series 10 Windows, Ultra-thin Polymer X-Ray Windows, Sep. 2006, 2 pages.
www.moxtek.com, X-Ray Windows, ProLINE Series 20 Windows Ultra-thin Polymer X-ray Windows, 2 pages. Applicant believes that this product was offered for sale prior to the filing date of applicant's application.
Yan, Xing-Bin, et al., Fabrications of Three-Dimensional ZnO-Carbon Nanotube (CNT) Hybrids Using Self-Assembled CNT Micropatterns as Framework, 2007. pp. 17254-17259, vol. III.
U.S. Appl. No. 12/640,154, filed Dec. 17, 2009; Krzysztof Kozaczek; office action issued Apr. 26, 20111.
U.S. Appl. No. 12/640,154, filed Dec. 17, 2009; Krzysztof Kozaczek; office action issued Jun. 9, 2011.
U.S. Appl. No. 12/407,457, filed Mar. 19, 2009; Sterling W. Cornaby; office action issued Jun. 14, 2011.
U.S. Appl. No. 12/640,154, filed Dec. 17, 2009; Krzysztof Kozaczek; notice of allowance issued May 23, 2011.
U.S. Appl. No. 12/239,302, filed Sep. 26, 2008; Robert C. Davis; office action issued May 26, 2011.
Nakajima et al.; Trial Use of Carbon-Fiber-Reinforced Plastic as a Non-Bragg Window Material of X-Ray Transmission; Rev. Sci. Instrum.; Jul. 1989; pp. 2432-2435 ; vol. 60; No. 7.
Nakajima et al.; "Trial use of carbon-fiber-reinforced plastic as a non-Bragg window material of x-ray transmission"; Rev. Sci. Instrum 60 (7), Jul. 1989.
Coleman, et al.; "Small but strong: A review of the mechanical properties of carbon nanotube-polymer composites"; Carbon 44 (2006) 1624-1652.
Najafi, et al.; "Radiation resistant polymer-carbon nanotube nanocomposite thin films"; Department of Materials Science and Engineering . . . Nov. 21, 2004.
Wang, et al.; "Highly oriented carbon nanotube papers made of aligned carbon nanotubes"; Tsinghua-Foxconn Nanotechnology Research Center and Department of Physics; Published Jan. 31, 2008.
Xie, et al.; "Dispersion and alignment of carbon nanotubes in polymer matrix: A review"; Center for Advanced Materials Technology; Apr. 20, 2005.
Wu, et al.; "Mechanical properties and thermo-gravimetric analysis of PBO thin films"; Advanced Materials Laboratory, Institute of Electro-Optical Engineering; Apr. 30, 2006.
Coleman, et al.; "Mechanical Reinforcement of Polymers Using Carbon Nanotubes"; Adv. Mater. 2006, 18, 689-706.
Zhang, et al.; "Superaligned Carbon Nanotube Grid for High Resolution Transmission Electron Microscopy of Nanomaterials"; 2008 American Chemical Society.
Hu, et al.; "Carbon Nanotube Thin Films: Fabrication, Properties, and Applications"; 2010 American Chemical Society Jul. 22, 2010.
Neyco, France,"SEM & TEM: Grids";catalog; http://www.neyco.fr/pdf/Grids.pdf#page=1.
Hexcel Corporation; "Prepreg Technology" brochure; http://www.hexcel.com/Reso2882urces/DataSheets/Brochure-Data-Sheets/Prepreg_Technology.pdf.
ML3 Scientific; SpectrumXTM Ultrathin X-Ray Windows; as accessed on May 26, 2011; 3 pages.
Chakrapani et al.; Capillarity-Driven Assembly of Two-Dimensional Cellular Carbon Nanotube Foams; PNAS; Mar. 23, 2004; pp. 4009-4012; vol. 101; No. 12.
PCT Application PCT/US2010/056011; filed Nov. 9, 2010; Krzysztof Kozaczek; International Search Report mailed Jul. 13, 2011.
U.S. Appl. No. 12/783,707, filed May 20, 2010; Steven D. Liddiard; office action issued Jun. 22, 2012.
U.S. Appl. No. 12/239,281, filed Sep. 26, 2008; Robert C. Davis; office action issued May 24, 2012.
U.S. Appl. No. 13/209,862, filed Aug. 15, 2011; Sterling W. Cornaby; office action issued Oct. 9, 2012.
U.S. Appl. No. 13/312,531, filed Dec. 6, 2011; Steve Liddiard; office action dated Dec. 20, 2013.
U.S. Appl. No. 12/899,750, filed Oct. 7, 2010; Steven Liddiard; office action dated Oct. 15, 2012.
PCT application EP12167551.6; filed May 10, 2012: Robert C. Davis; European search report mailed Nov. 21, 2013.

* cited by examiner

US 9,305,735 B2

REINFORCED POLYMER X-RAY WINDOW

CLAIM OF PRIORITY

This is a continuation-in-part of U.S. patent application Ser. No. 12/239,281, filed on Sep. 26, 2008; which claims priority of U.S. Patent Application Ser. No. 60/995,881, filed Sep. 28, 2007; and is also a continuation-in-part of U.S. patent application Ser. No. 12/899,750, filed Oct. 7, 2010; which are hereby incorporated by reference.

This also claims priority to U.S. Provisional Patent Application Ser. No. 61/437,792, filed on Jan. 31, 2011; which is incorporated by reference.

BACKGROUND

X-ray windows are used for enclosing an x-ray source or detection device. The window can be used to separate air from a vacuum within the enclosure while allowing passage of x-rays through the window.

X-ray windows can be made of a thin film. It can be desirable to minimize attenuation of the x-rays, especially with low energy x-rays, thus it is desirable that the film is made of a material and thickness that will result in minimal attenuation of the x-rays. Thinner films attenuate x-rays less than thick films, but the film must not be too thin or the film may sag or break. A sagging film can result in cracking of corrosion resistant coatings and a broken film will allow air to enter the enclosure, often destroying the functionality of the device. Thus it is desirable to have a film that is made of a material that will have sufficient strength to avoid breaking or sagging but also as thin as possible for minimizing attenuation of x-rays.

A support structure can be used to support the thin film. Use of a support structure can allow use of a thinner film than could be used without the support structure. For example, a support structure can be made of a plurality of ribs with openings therein. The thin film can be attached to and span the ribs and openings. In order to minimize attenuation of x-rays, it is desirable that the ribs of the structure have a smaller width and height. Wider and higher ribs are typically stronger. Stronger rib materials can provide sufficient strength at a smaller size.

X-ray windows are often used with x-ray detectors. In order to avoid contamination of an x-ray spectra from a sample being measured, it is desirable that x-rays impinging on the x-ray detector are only emitted from the source to be measured. Unfortunately, x-ray windows, including the window support structure and thin film, can also fluoresce and thus emit x-rays that can cause contamination lines in the x-ray spectra. Contamination of the x-ray spectra caused by low atomic number elements is less problematic than contamination caused by higher atomic number elements. It is desirable therefore that the window and support structure be made of a material with as low of an atomic number as possible in order to minimize this noise.

SUMMARY

It has been recognized that it would be advantageous to have an x-ray window that is strong, minimizes attenuation of x-rays, and minimizes x-ray spectra contamination. The present invention is directed to an x-ray window that satisfies the need for an x-ray window that is strong, minimizes attenuation of x-rays, and minimizes x-ray spectra contamination.

In one embodiment, the x-ray window includes a film comprised of a polymer and a high strength material. The high strength material comprises carbon nanotubes and/or graphene. The high strength material reinforces the polymer, thus making a stronger polymer layer. Carbon has a low atomic number (6) and thus is less likely to contaminate an x-ray spectra than an element with a higher atomic number.

In another embodiment, the x-ray window includes a plurality of ribs having openings and a support frame disposed around and connected to a perimeter of the ribs. The ribs and the support frame comprise a high strength material and a polymer. The high strength material comprises carbon nanotubes and/or graphene. The high strength material reinforces the polymer. A thin film is disposed over and spans the plurality of ribs and openings.

DEFINITIONS

Figure 1:
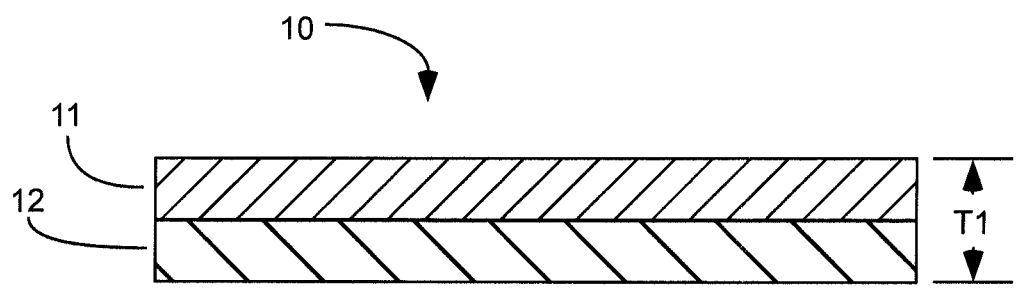
FIG. 1 is a schematic cross-sectional side view of an x-ray window film including a high strength material and a polymer in accordance with an embodiment of the present invention.

As used herein, the term "about" is used to provide flexibility to a numerical range endpoint by providing that a given value may be "a little above" or "a little below" the endpoint.

As used herein, the term "CNT" means carbon nanotubes or carbon nanotube.

As used herein, the term "sccm" means standard cubic centimeters per minute.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "VACNT" means vertically aligned carbon nanotubes.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

As illustrated in FIG. 1, an x-ray window film 10 is shown comprising a polymer 12 and a high strength material 11. The high strength material 11, in the various embodiments described herein, can comprise carbon nanotubes, graphene, or combinations thereof. The film 10 can have a thickness T1 of between about 50 nm to about 500 nm. Addition of a high strength material 11 to a polymer 12 can provide for a higher strength film 10 than with a polymer alone, thus allowing the film 10 to span greater distances without breaking or sagging.

Figure 2:
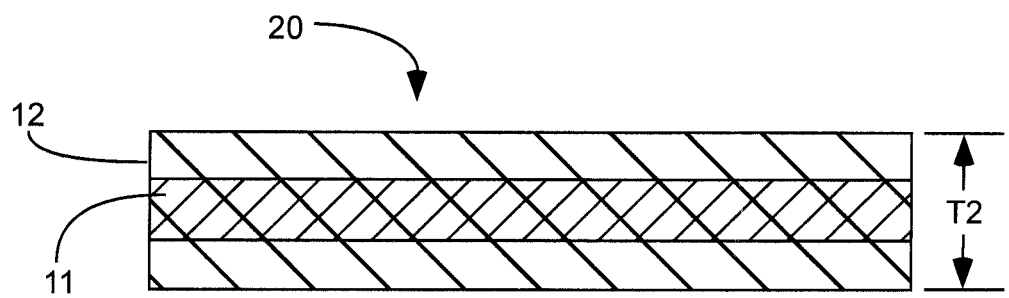
FIG. 2 is a schematic cross-sectional side view of an x-ray window composite film including a high strength material embedded in a polymer in accordance with an embodiment of the present invention.
Figure 3:
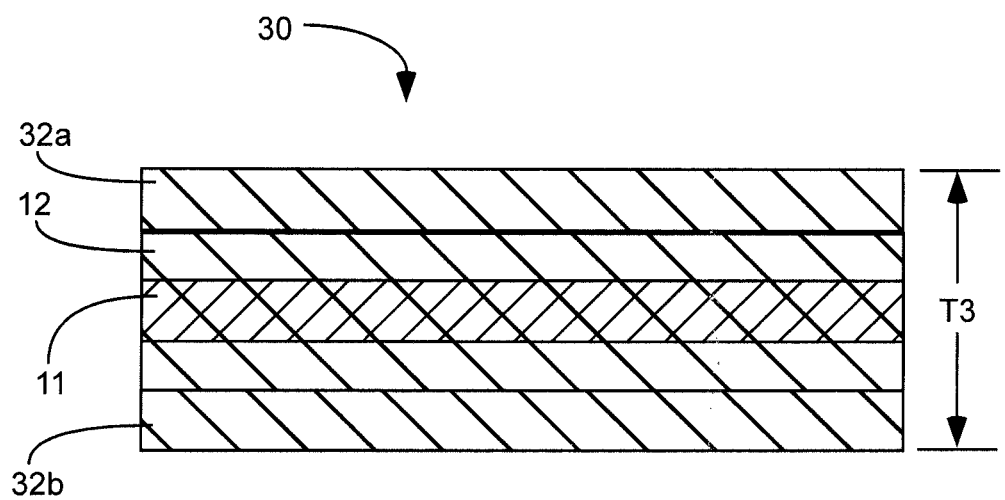
FIG. 3 is a schematic cross-sectional side view of an x-ray window composite film including a high strength material embedded in a polymer and also additional polymer layers disposed adjacent to the composite film, in accordance with an embodiment of the present invention.

A high strength material 11 can be an individual layer or may be embedded in the polymer 12 as shown in the x-ray window film 20 of FIG. 2. The film 20 can have a thickness T2 of between about 50 nm to about 500 nm. As illustrated in FIG. 3, an x-ray window film 30 is shown comprising a composite film including a high strength material 11 embedded in a polymer 12 and further comprising polymer layers 32a-b disposed adjacent to the composite film. The film 30 can have a thickness T3 of between about 50 nm to about 500 nm.

Figure 4:
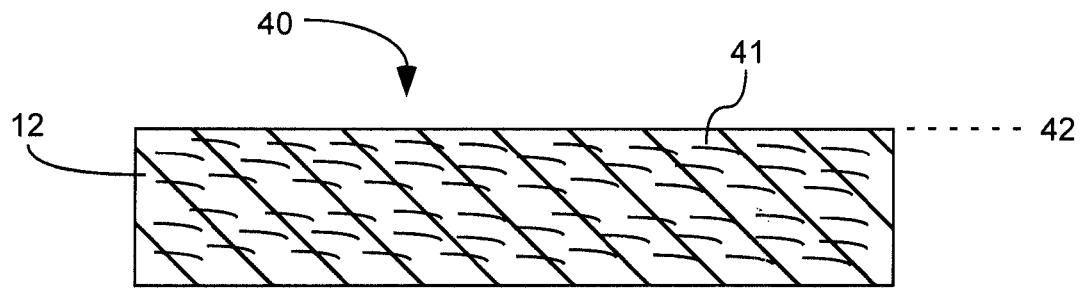
FIG. 4 is a schematic cross-sectional side view of an x-ray window film including carbon nanotubes embedded in a polymer and a majority of the carbon nanotubes are aligned substantially parallel with respect to a surface of the film, in accordance with an embodiment of the present invention.
Figure 5:
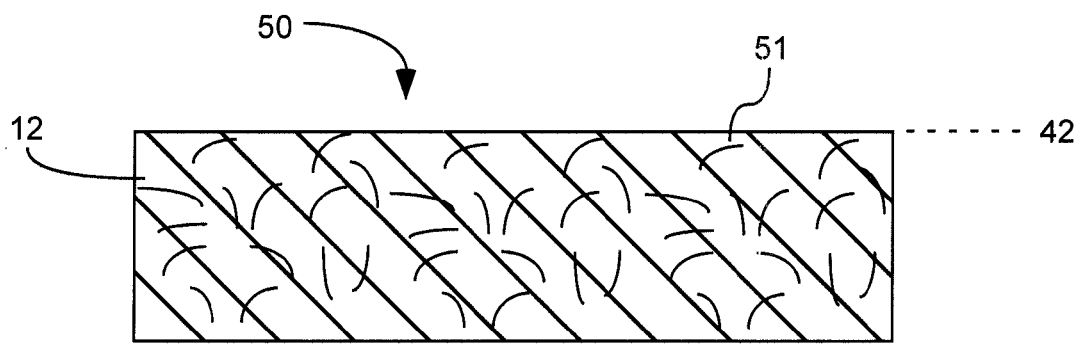
FIG. 5 is a schematic cross-sectional side view of an x-ray window film including carbon nanotubes embedded in a polymer and a majority of the carbon nanotubes are randomly aligned, in accordance with an embodiment of the present invention.

The high strength material 11, in the various embodiments described herein, can include carbon nanotubes. As illustrated in FIG. 4, in x-ray window 40 a majority of the carbon nanotubes 41 can be aligned substantially parallel with respect to a surface of the film 42. As described in more detail later, this substantially parallel alignment may be accomplished by rolling the carbon nanotubes 41 flat with use of a roller that is not very much larger in diameter than a height of the carbon nanotubes 41. As illustrated in x-ray window 50 of FIG. 5, a majority of the carbon nanotubes 51 can be randomly aligned. As described in more detail later, this random alignment may be accomplished by rolling the carbon nanotubes 51 flat with use of a roller that is very much larger in diameter than a height of the carbon nanotubes 51 or by spraying the carbon nanotubes onto a surface, such as a polymer.

Figure 6:
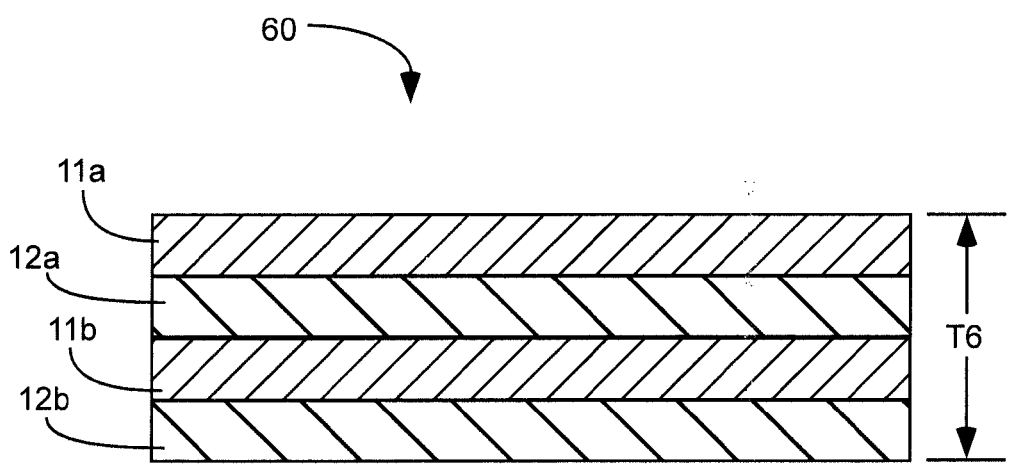
FIG. 6 is a schematic cross-sectional side view of an x-ray window film including two layers of high strength material and two layers of polymer in accordance with an embodiment of the present invention.

As illustrated in FIG. 6, x-ray window 60 can include at least two layers of high strength material 11a-b and at least two layers of polymer material 12a-b. In another embodiment, the x-ray window can include at least three layers of high strength material and at least three layers of polymer material. The high strength material layers and polymer layers can alternate. The x-ray window film 60 can have a thickness T6 of between about 50 nm to about 500 nm.

Figure 7:
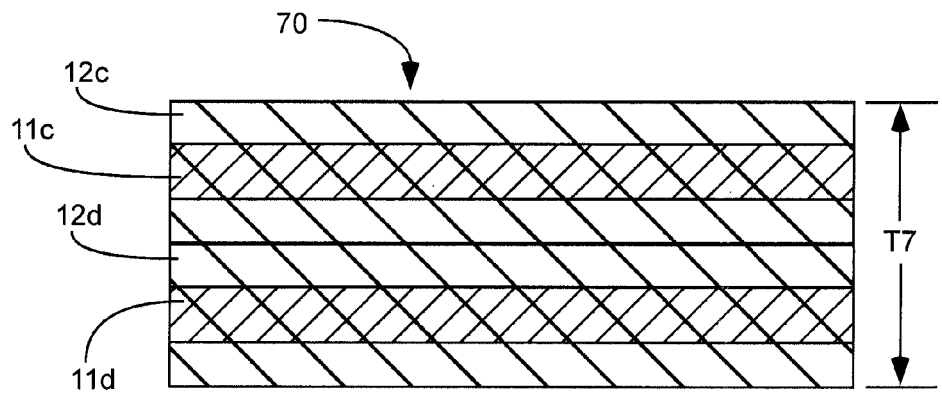
FIG. 7 is a schematic cross-sectional side view of two adjacent x-ray window composite films, each including a high strength material embedded in a polymer, in accordance with an embodiment of the present invention.

As illustrated in FIG. 7, x-ray window 70 can include at least two layers of high strength material 11c-d and at least two layers of polymer material 12c-d. In another embodiment, the x-ray window can include at least three layers of high strength material and at least three layers of polymer material. As illustrated in FIG. 7, the high strength material 11c-d can be embedded in the polymer 12c-d. The x-ray window film 70 can have a thickness T7 of between about 50 nm to about 500 nm.

In the various embodiments described herein, the polymer can comprise a polyimide. In the various embodiments described herein, the x-ray window film, comprising polymer and high strength material, can be substantially transmissive to x-rays having an energy in the range of 100-20,000 electronvolts; can be capable of withstanding a differential pressure of at least 1 atmosphere; and/or can be capable of withstanding temperatures of greater than 225° C. Materials and thicknesses may be selected to allow the window to withstand a differential pressure of at least 1 atmosphere, thus allowing the window to be used in a device, such as an x-ray detector or x-ray tube, with vacuum on one side, and atmospheric pressure on the other side. Materials may be selected to allow the window to withstand temperatures of greater than 225° C. Sometimes there is a need to subject x-ray windows to higher temperatures, such as in manufacturing, thus it can be valuable to have an x-ray window that can withstand high temperatures.

Figure 8:
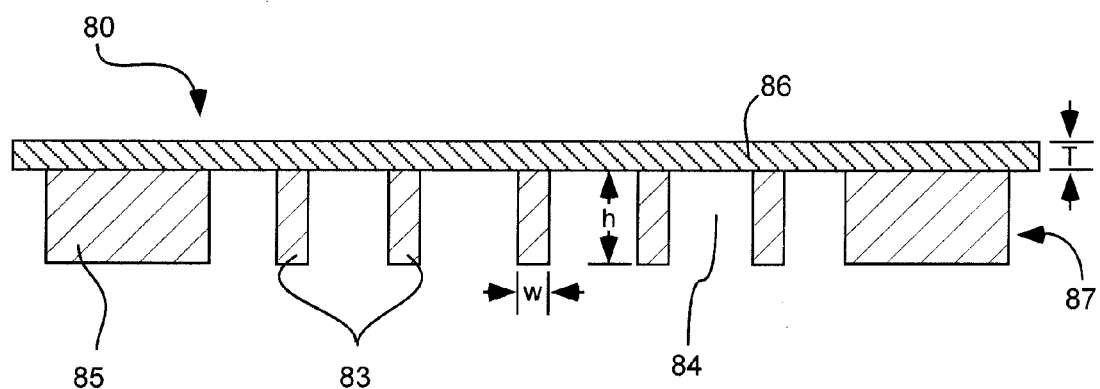
FIG. 8 is a schematic cross-sectional side view of an x-ray window including a thin film and a support structure accordance with an embodiment of the present invention.

As illustrated in FIG. 8, x-ray window 80 can include a film 86 supported by a support structure 87. The support structure can comprise a plurality of ribs 83 having openings 84 therein, wherein tops of the ribs 83 terminate substantially in a common plane. The support structure 87 can also include a support frame 85 disposed around a perimeter of the plurality of ribs 83. The film 86 can be disposed over and span the plurality of ribs 83 and openings 84. The support structure 87 can give support to the film 86, thus allowing the film 86 to span larger distances without sagging. In one embodiment, the film 86 comprises a polymer and a high strength material according to the various embodiments described herein. In another embodiment, the support structure 87 comprises a polymer and a high strength material according to the various embodiments described herein, and the film 86 comprises diamond, graphene, diamond-like carbon, carbon nanotubes, polymer, beryllium, or combinations thereof. In one embodiment, the openings take up about 70% to about 95% of a total area within an inner perimeter of the support frame. A larger area for openings can be desirable for minimizing attenuation of x-rays in the support structure 87. In one embodiment, each rib is about less than 100 μm wide w and each rib is between about 30 μm to about 300 μm high h.

Figure 9:
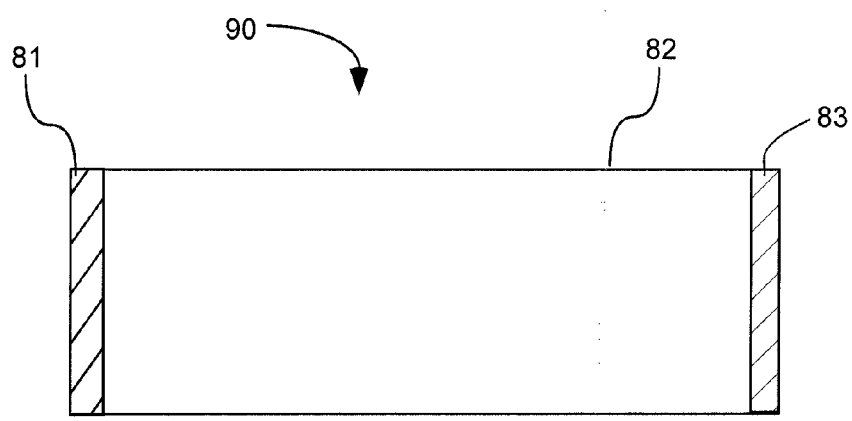
FIG. 9 is a schematic cross-sectional side view of an x-ray tube including an x-ray window in accordance with an embodiment of the present invention.

As illustrated in FIG. 9, x-ray window embodiments described herein can be mounted on an x-ray tube 90. The x-ray tube can comprise an evacuated cylinder 82, a cathode 83 disposed at one end of the evacuated cylinder; and a window and anode 81 disposed at an opposing end of the cylinder 82.

Figure 10:
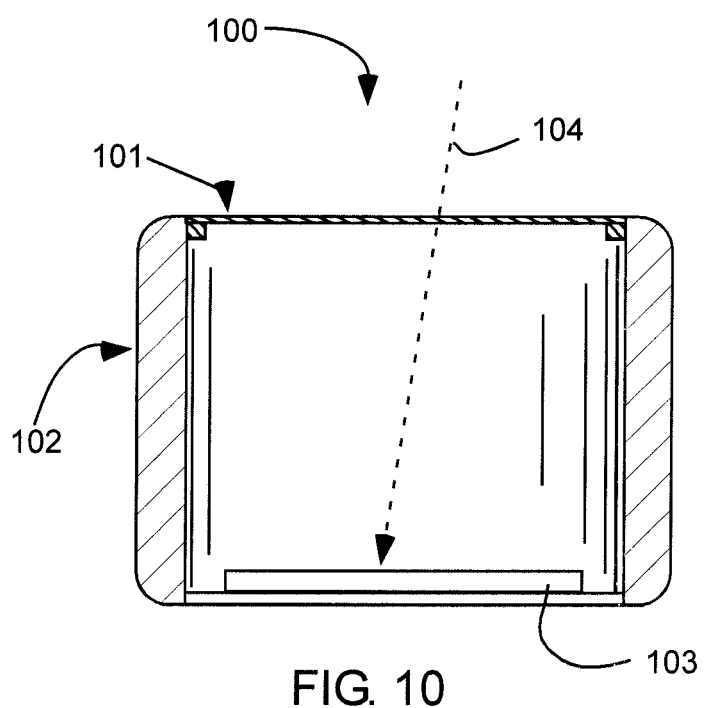
FIG. 10 is a schematic cross-sectional side view of an x-ray detector including an x-ray window in accordance with an embodiment of the present invention.
Figure 11:
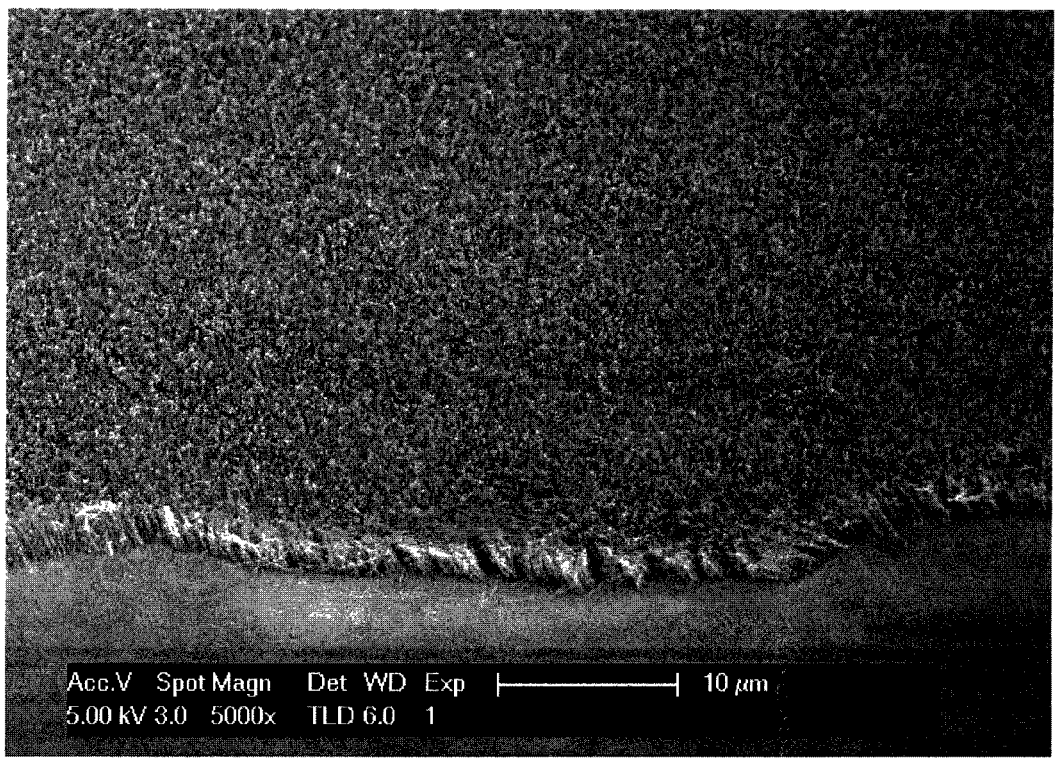
FIG. 11 is a scanning electron microscope image of a vertically aligned carbon nanotube layer in accordance with an embodiment of the present invention.
Figure 12:
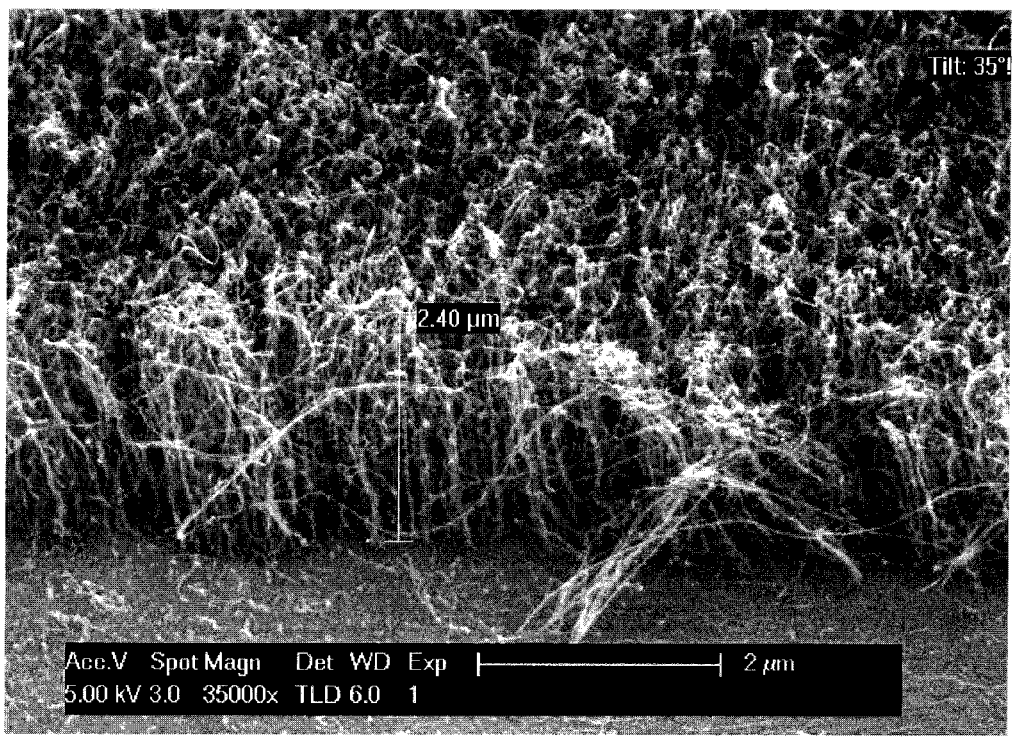
FIG. 12 is a scanning electron microscope image of a vertically aligned carbon nanotube layer, the carbon nanotubes having a height of about 2.4 µm, in accordance with an embodiment of the present invention.
Figure 13:
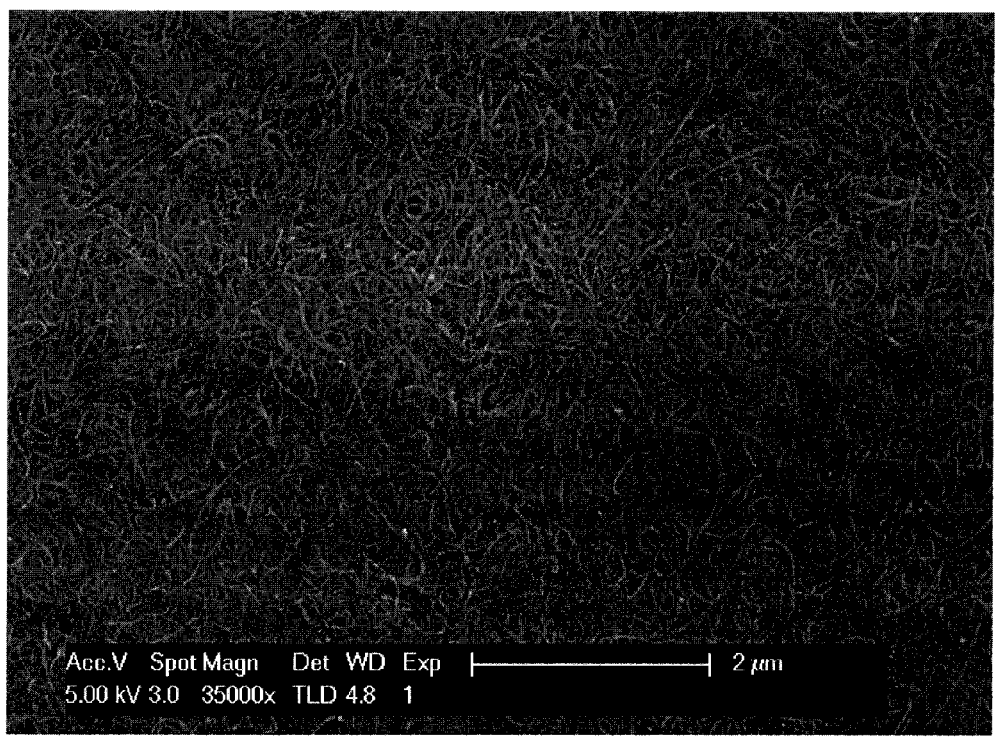
FIG. 13 is a scanning electron microscope image of a carbon nanotube layer, after rolling the carbon nanotubes flat, in accordance with an embodiment of the present invention.

As illustrated in FIG. 10, x-ray window embodiments described herein can be used for x-ray detection 100. The x-ray window 101 can be attached to a mount 102. The mount 102 can be attached to an x-ray detector 103; and the x-ray window 101 can allow x-rays 104 to impinge upon the detector 103.

How to Make:

Carbon Nanotube Formation:

A carbon nanotube film may be formed by placing a substrate with a layer comprising alumina and a layer comprising iron in an oven at a temperature of greater than 600° C. then flowing ethylene across the substrate thus allowing carbon nanotubes to grow on the substrate. Growth rate can be controlled by the ethylene flow rate and by diluting the ethylene with argon gas. Thickness of the carbon nanotube forest can be controlled by the ethylene flow time. Use of sputtered iron catalyst instead of thermal deposited iron can result in slower carbon nanotube growth.

An Example of One Method of Forming the Carbon Nanotubes:

A silicon wafer was coated with a 30 nm alumina layer. A 6 nm iron layer was then deposited on the alumina layer by PVD sputtering. CNT forest samples were made having thicknesses of around 2 μm, 1 μm, and 500 nm with 1 second ethylene flow with different ethylene flow rates.

Samples were put onto a quartz boat and loaded into a quartz tube of a tube furnace (CNT growth furnace). Argon was switched on to flow into the tube furnace at 50% flow rate (355 sccm) and kept on during the whole growth cycle. After Argon purged the air out of the tube, hydrogen flow was turned on at a 20% flow rate (429 sccm) and the tube furnace was heated up to 750° C.

Ethylene flow was turned on for 1 second for short CNT forest growth at 50% flow rate (604 sccm). Shorter forests were produced with lower ethylene flow rate. Ethylene and hydrogen flow were turned off immediately after the one second growth.

The cover of the tube furnace was opened to accelerate the cooling process. When the temperature was down to 200° C., the samples were taken out from the tube furnace. Argon flow was turned off. This CNT growth cycle was finished.

Combining Carbon Nanotubes with Polymer—Method 1:

The carbon nanotubes can be aligned horizontally, or aligned randomly, by placing a film on top of the carbon nanotubes, rolling the carbon nanotubes flat with a cylindrical roller, then removing the film. For alignment of the carbon nanotubes in substantially a single direction, or in a direction substantially parallel with a surface of the film, the roller should not be very much larger in diameter than a height of the carbon nanotubes. Rollers that are much larger than the diameter of the roller can result in more random alignment of the carbon nanotubes.

For Example of One Method of Rolling the Carbon Nanotubes:

A VACNT forest sample with a size of around 18 mm×18 mm was directly placed on a flat, hard desk surface to avoid substrate cracking. An aluminum foil of about 30 mm×30 mm was placed over and covered the whole nanotube sample surface. Tape was used to cover the edges of the substrate and aluminum foil to avoid substrate shift. A 50 mm×80 mm nitrile sheet of about 0.4 mm in thickness was placed over the aluminum foil and also taped to the desk. A smooth glass tube with 1.57 cm outer diameter was rolled and pressed over the nitrile rubber sheet, aluminum foil, and the CNT sample from different directions for 100 times. The nitrile rubber sheet and the aluminum foil were removed. A thinner and denser CNT film was obtained.

A polymer film can then be applied, such as by placing a polymer film on the carbon nanotubes. The polymer film may be pressed onto the carbon nanotubes in order to embed the carbon nanotubes in the film. Alternatively, a liquid polymer may be poured onto the carbon nanotubes or spun onto the carbon nanotubes, then the polymer can harden by suitable method. The carbon nanotubes can then be released from the substrate, such as by use of hydrofluoric acid.

Combining Carbon Nanotubes with Polymer—Method 2:

Carbon nanotubes may be sprayed onto a polymer film. Alternatively, carbon nanotubes may be sprayed onto a liquid polymer, then the polymer may be cured. A method for spraying carbon nanotubes is described in *Chemical Engineering Science*, "Insights into the physics of spray coating of SWNT films", available online 5 Dec. 2009, which is incorporated herein by reference.

In summary of the above method, a suspension of carbon nanotubes may be prepared by an appropriate solvent, such as water with a surfactant, and sonication. The carbon nanotube suspension may then be sprayed onto the appropriate surface. In the present invention, the carbon nanotube suspension can be sprayed onto a polymer. Another polymer layer can be deposited onto the carbon nanotubes, such as by spin coating.

Layer Including Graphene:

A graphene film may be made by flowing methane across a copper surface in an oven at a temperature of greater than 1000° C., thus allowing formation of a graphene layer. The copper may be removed from the graphene layer such as by dissolving the copper in an acid. Liquid polymer may be sprayed on or poured on then cured, such as in an oven, thus forming a composite layer with graphene and polymer.

Other Manufacturing Issues:

The above methods may be combined for making a film with graphene, carbon nanotubes, and polymer. Multiple layers of carbon nanotube and polymer may be stacked together. Multiple layers of graphene and polymer may be stacked together. A layer, or layers, carbon nanotube and polymer may be stacked with a layer, or layers, of graphene and polymer.

A support structure can be made by patterning and etching. The support structure can be made of polymer and a high strength material, or may be made of other material. A film, or layers of films may be placed onto the support structure. The film can comprise diamond, graphene, diamond-like carbon, carbon nanotubes, polymer, beryllium, or combinations thereof. An adhesive may be used to adhere the film to the support structure.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

What is claimed is:

1. An x-ray window including a film, the film comprising:
   a) graphene embedded in a polymer;
   b) the film is substantially transmissive to x-rays having an energy in the range of 100-20,000 electronvolts;
   c) the film is capable of withstanding a differential pressure of at least 1 atmosphere;

d) the film has a thickness of between about 50 nm to about 500 nm;
e) the film is attached to a mount; and
f) the mount is configured for attachment to an x-ray tube or an x-ray window.

2. The x-ray window of claim 1, further comprising at least one polymer layer disposed adjacent to the film.

3. The x-ray window of claim 1, wherein the film comprises at least two films stacked together, each film including graphene embedded in a polymer.

4. The x-ray window of claim 1:
a) further comprising a plurality of ribs having openings therein, wherein tops of the ribs terminate substantially in a common plane, and a support frame disposed around a perimeter of the plurality of ribs;
b) wherein the film is disposed over and spans the plurality of ribs and openings to pass radiation therethrough; and
c) the ribs comprise carbon nanotubes embedded in a polymer.

5. The x-ray window of claim 1, wherein the polymer comprises a polyimide.

6. The x-ray window of claim 1, wherein
the film is capable of withstanding temperatures of greater than 225° C.

7. The x-ray window of claim 1, wherein the film is mounted on an x-ray tube.

8. The x-ray window of claim 1, wherein:
a) the mount is attached to an x-ray detector; and
b) the film allow x-rays to impinge upon the detector.

9. The x-ray window of claim 1, further comprising:
a) another film including carbon nanotubes disposed in a polymer;
b) the another film including the carbon nanotubes disposed in the polymer stacked together with the film including graphene embedded in the polymer.

10. An x-ray window comprising:
a) a plurality of ribs having openings therein and tops of the ribs terminate substantially in a common plane;
b) a support frame disposed around and connected to a perimeter of the plurality of ribs;
c) the ribs and support frame comprise carbon nanotubes embedded in a polymer; and
e) a thin film disposed over and spanning the plurality of ribs and openings to pass radiation therethrough.

11. The x-ray window of claim 10 wherein the openings take up about 70% to about 95% of a total area within an inner perimeter of the support frame.

12. The x-ray window of claim 10 wherein each rib is about less than 100 μm wide and each rib is between about 30 μm to about 300 μm high.

13. The x-ray window of claim 10 wherein the thin film comprises graphene and polyimide.

14. The x-ray window of claim 13 wherein the graphene is embedded in the polyimide.

15. An x-ray window comprising:
a) a composite film comprising carbon nanotubes embedded in a polymer;
b) the composite film has a thickness of between about 50 nm to about 500 nm;
c) the composite film is substantially transmissive to x-rays having an energy in the range of 100-20,000 electron-volts;
d) the composite film is capable of withstanding a differential pressure of at least 1 atmosphere; and
e) the composite film is capable of withstanding temperatures of greater than 225° C.

16. The x-ray window of claim 15, wherein the a majority of the carbon nanotubes are randomly aligned.

17. The x-ray window of claim 15, wherein a majority of the carbon nanotubes are aligned substantially parallel with respect to a surface of the film.

18. The x-ray window of claim 15, further comprising:
a) a plurality of ribs having openings therein and tops of the ribs terminate substantially in a common plane;
b) a support frame disposed around and connected to a perimeter of the plurality of ribs;
c) the ribs and support frame comprise carbon nanotubes and a polymer; and
d) the composite film disposed over and spanning the plurality of ribs and openings to pass radiation therethrough.

* * * * *